United States Patent [19]

Streiff

[11] Patent Number: 5,174,219
[45] Date of Patent: Dec. 29, 1992

[54] BOGIE FOR A TRACK-GUIDED VEHICLE

[75] Inventor: Mathias Streiff, Schwanden, Switzerland

[73] Assignee: Mathias Streiff AG, Schwanden, Switzerland

[21] Appl. No.: 719,189

[22] Filed: Jun. 21, 1991

[30] Foreign Application Priority Data

Jun. 29, 1990 [CH] Switzerland .................. 2181/90

[51] Int. Cl.⁵ .................................................. B61F 5/16
[52] U.S. Cl. ................................ 105/199.4; 104/119; 104/247; 104/209
[58] Field of Search .............. 105/157.1, 175.1, 182.1, 105/199.1, 199.4, 453; 104/119, 243, 245, 246, 247, 173.1; 180/167; 280/86, 713

[56] References Cited

U.S. PATENT DOCUMENTS

| | | | |
|---|---|---|---|
| 1,870,738 | 8/1932 | Kruckenberg et al. | 104/119 |
| 4,092,929 | 6/1978 | Laurent | 104/173.1 |
| 4,183,304 | 1/1980 | Förster | 104/247 |
| 4,232,611 | 11/1980 | Vozumi | 104/246 X |
| 4,630,543 | 12/1986 | McQueen | 104/119 X |

FOREIGN PATENT DOCUMENTS 247389 12/1987 European Pat. Off. ......... 105/157.1
706597 3/1931 France .............................. 104/247

OTHER PUBLICATIONS

Tucker, Westinghouse people mover system for Gatwick airport, Railway Eng. Int., 1980, vol. 5, No. 2, pp. 44-46.

*Primary Examiner*—Matthew C. Graham
*Assistant Examiner*—Kevin D. Rutherford
*Attorney, Agent, or Firm*—Shoemaker and Mattare, Ltd.

[57] ABSTRACT

The bogie (1) features a pair of running wheels (3, 3') running on bearings fastened to a rocking frame (4). The rocking frame is hinged on one side to the bogie and connected on the other side over spring devices (5, 5') with the frame. Hereby the running wheels are located inside a slewing ring resting on the frame. Guide wheels (11, 11' and 12, 12' respectively), each running on bearings attached to a transverse link (13), are provided for lateral guidance along the track. The spring-loaded transverse links swivel horizontally and are hinged to a guide body (14).

20 Claims, 14 Drawing Sheets

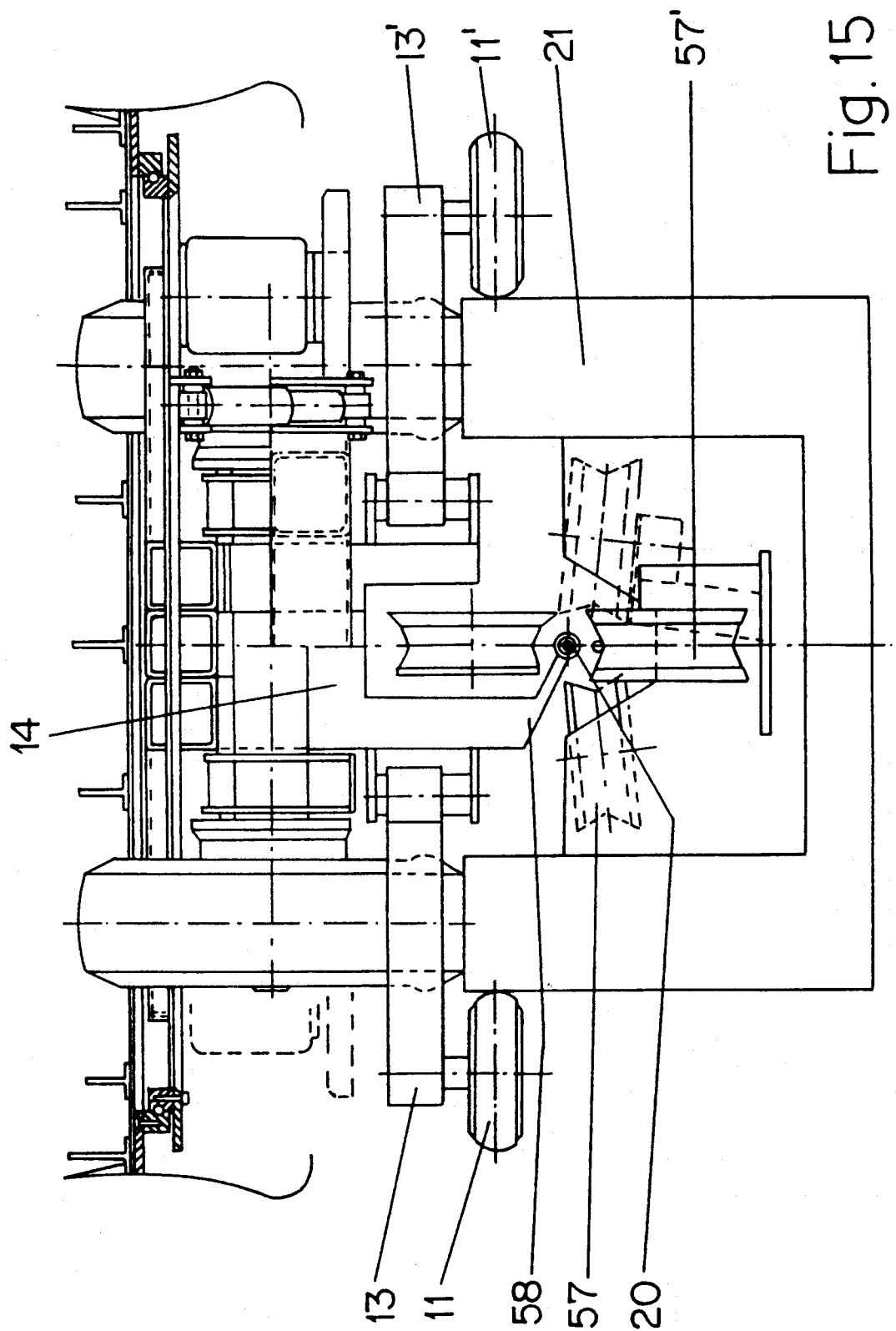

BOGIE FOR A TRACK-GUIDED VEHICLE

This invention relates to a bogie for a track-guided vehicle. Bogies of this type are mainly used for local traffic people mover systems featuring pneumatic tires. These local traffic vehicles run on a track of concrete or steel which may also be designed as an elevated railway. The drive is either by way of a hauling rope guided on the track or by a drive motor located in the vehicle.

BACKGROUND

Generically comparable bogies are already known, where the axle of the running wheels rests on a pair of leaf springs attached to the frame. Such a bogie is described e.g. by John R. Tucker in "Railway Engineer. International", Vol. 5 (1980) March/April, pages 44–46. The running wheels are arranged outside the slewing ring. With the known bogies, lateral tracking stability is assured by horizontally arranged and relatively rigidly mounted guide wheels which are pressed against a lateral guidance.

A particular disadvantage of the known bogies is that wide gauges and therefore also relatively large track cross sections are required because of the position of the running wheels. For aesthetic as well as cost reasons, however, it would be better to keep the track cross sections as small as possible. Furthermore, the known bogies are distinguished by partly unsatisfactory damping and spring characteristics.

SUMMARY OF THE INVENTION

It is a purpose of the invention, therefore, to provide a bogie of the type stated initially which, while being of a compact design and requiring a small track width, displays optimal damping and, as the case may be, also spring characteristics. In accordance with the invention this task is met by a bogie described in the claims below.

The rocking frame assures optimal damping and resilience in the vertical direction. Depending on the type of spring device it is possible to adjust the spring characteristics within a certain range. The rocking frame can be accommodated between the running wheels, thus allowing a relatively narrow wheel base. This also permits arrangement of the running wheels within the slewing ring. The narrow wheel base has positive effects when travelling through the curves. Several shock absorbers could be mounted between the rocking frame and frame, depending on the expected loads.

Particularly good torsional rigidity is obtained if the frame is equipped with a platform for acceptance of the slewing ring and if the rocking frame, at its tiltable end, features a transverse bar mounted across the tilting plane. Spring devices at both outer ends of the transverse bar support the platform. In this way it is also assured that the transverse forces occurring in curves are taken up relatively far from the centre near the running wheels. At least one shock absorber is mounted between the platform and rocking frame to reduce knocks and bumps. The spring devices are preferably pneumatic springs which can be adjusted for particular spring characteristics. However, spiral springs, disk springs or similar springs could be used as well.

Of particular advantage is a braking device arranged on the rocking frame, acting directly onto the axle or the wheels of the pair of running wheels. A drive motor, e.g. an electric motor, mounted on the rocking frame would also be conceivable.

Humans can absorb vertical vibrations and bumps relatively easily through their spinal column. However, of special significance for travelling comfort is also the damping of horizontal bumps, as these are particularly unpleasant for the human spine. The relatively rigid tracking characteristics of known bogies are unsatisfactory in this respect. The problem can be solved in optimal manner by providing the frame beneath the slewing ring with a longitudinal guide body and by attaching at least one pair of guide wheels for lateral tracking stability to this guide body, whereby each guide wheel of the pair of guide wheels runs on bearings on a transverse link, the transverse link preferably being hinged to the guide body so as to be able to swivel horizontally and to be springy. In this way any lateral bumps caused by the track guidance are not immediately transferred to the vehicle cabin. The spring-mounted transverse links dampen such bumps without diminishing the tracking stability. Furthermore, shock absorbers may be located between the transverse links and the guide body. The guide wheels of a pair of guide wheels can be tensioned apart and support themselves e.g. laterally against the track for the running wheels. On the other hand, the guide wheels can also be tensioned towards each other and support themselves against a rail or similar device located between the running wheels.

The rocking frame as well as the transverse links can be of a design which guarantees certain emergency running properties in case of failure of a running wheel or of a guide wheel respectively. For this purpose, a sliding block is arranged at each of the freely swivelling ends of the rocking frame and of the transverse links respectively, whereby the sliding block does not touch the track as long as the wheel is good order. If, for example, a tire bursts, the sliding block touches the track and assures adequate tracking of the bogie until the vehicle can be stopped.

It is especially advantageous to arrange a rope clamping device at the guide body to which the transverse links are attached. The principle of the funicular railway offers certain benefits which cause it to be applied frequently, mainly for short distances. It is now particularly practical if the hauling rope is not just firmly anchored to the bogie. Such rigid clamping points lead to high loads on the rope and often to wire breakages. Clamping of the rope by means of the rope clamping device offers the advantage that an endless rope loop can be used and that the clamping points can be shifted at certain time intervals. In this way the rope is never under load at the same point over a prolonged time.

Further individual characteristics and benefits of the invention become evident from the drawings and from the descriptions hereafter. In this context it should be noted that it is in particular also the amalgamation of individual characteristics which leads to an extremely compact and advantageous bogie which combines various properties. The drawings show one execution example each of a rope-hauled and of a motor-driven vehicle, whereby the same bogie is used.

BRIEF DESCRIPTION OF THE DRAWINGS

FIG. 15 is a further execution example with an alternative rope fixation device.

DESCRIPTION OF THE PREFERRED EMBODIMENT

Figure 1:
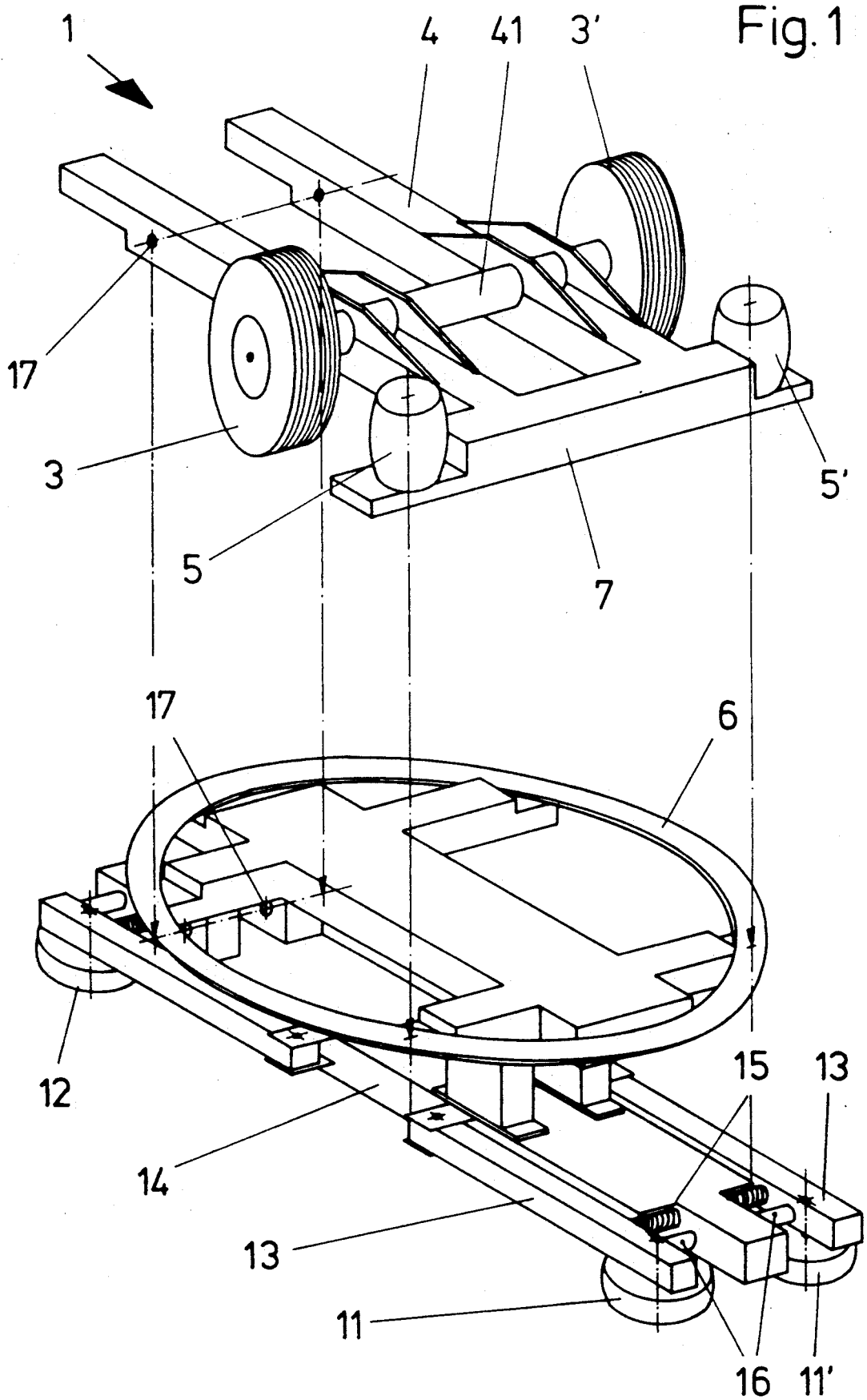
FIG. 1 is a bogie according to the invention in a highly simplified, perspective presentation in which the rocking body is separated from the frame.

FIG. 1 shows the essential components of bogie 1 hereafter described in more detail, namely the pair of running wheels 3, 3' attached to the rocking frame, and the pairs of guide wheels 11, 11' and 12, 12' respectively hinged to guide body 14, presented one above the other and separately. Rocking frame 4 is hinged to a joint 17 under a circular ring-shaped platform 6. The tilting plane of the rocking frame hereby runs in the direction of vehicle motion. Platform 6 serves to support the slewing ring not shown here. The rocking frame 4 features a transverse bar 7 at its free end, with the said bar carrying spring devices 5 and 5' at its outer ends. Platform 6 is supported by these spring devices. Axle 41 of the running wheels 3 and 3' runs on bearings held by the rocking frame 4. The running wheels are arranged within platform 6 and inside the slewing ring resting on platform 6 respectively.

Beneath platform 6 and firmly connected to it is an oblong guide body 14. Like the rocking frame 4, it runs in the direction of vehicle motion. Hinged to both sides of guide body 14 are the transverse links 13, preferably able to horizontally swing. Spring devices 15 are arranged between the free ends of these transverse links and the guide body 14. They pre-stress the transverse links outwards. The guide wheels 11, 11' and 12, 12' respectively run freely in bearings held by the transverse links.

These guide wheels assure lateral tracking stability as described in more detail hereafter. As each guide wheel is spring-loaded individually, the bogie displays very good running properties also in the horizontal direction, thus allowing higher travelling speeds and in this way providing a higher transport capacity.

Figure 2:
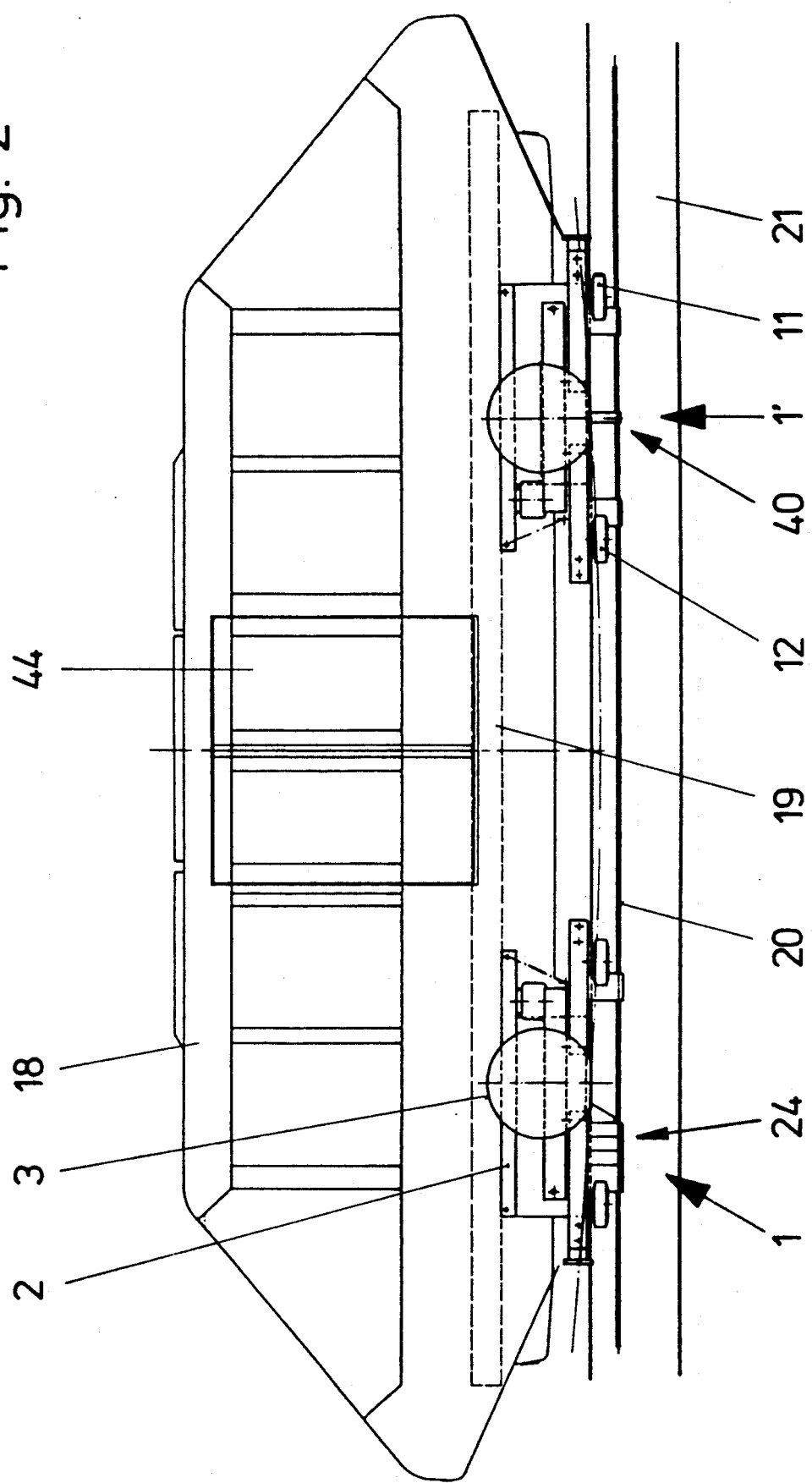
FIG. 2 is a side view of a rope-hauled vehicle with two bogies.
Figure 3:
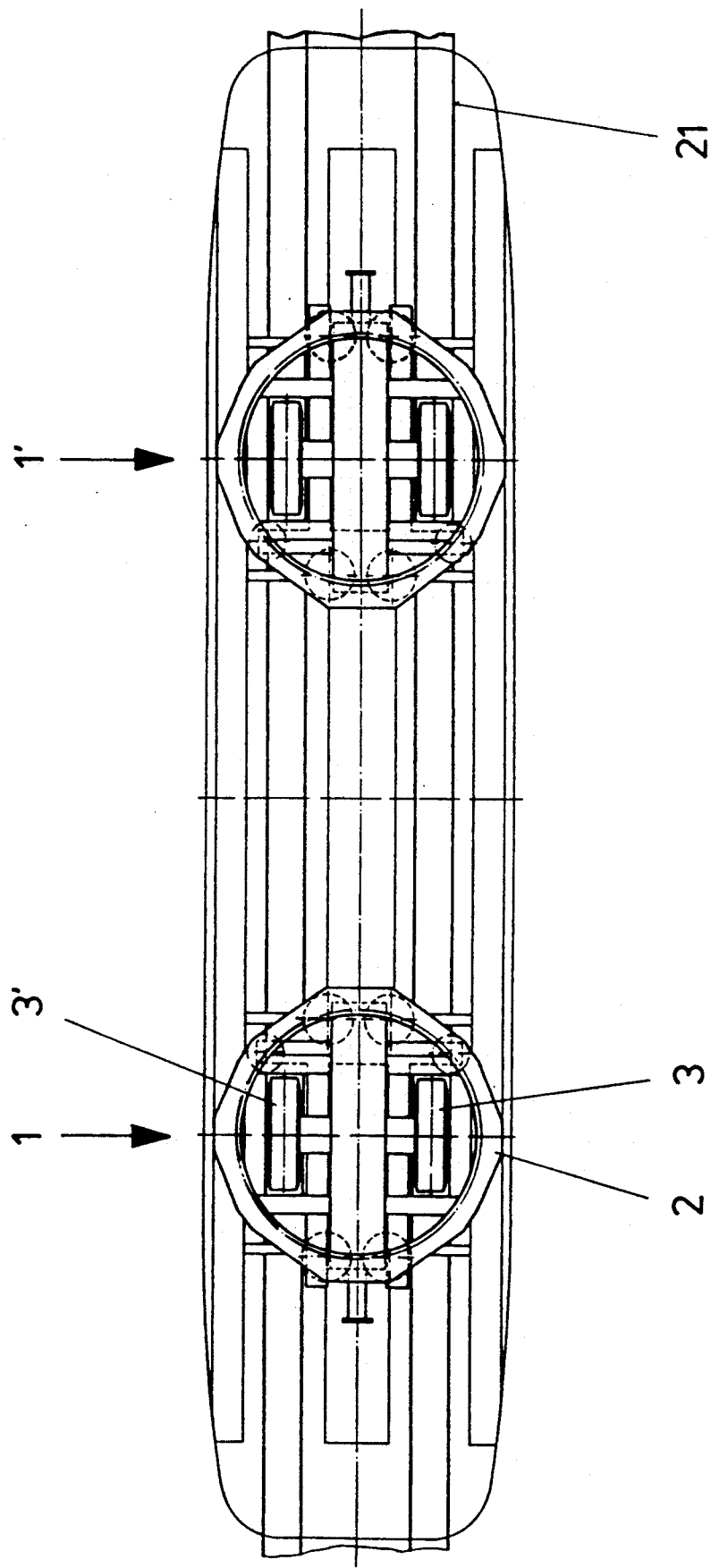
FIG. 3 is a top view of the bogies according to FIG. 2.

FIGS. 2 and 3 show a rope-hauled vehicle equipped with two bogies 1 and 1' in accordance with the invention. The vehicle floor rests on the slewing rings 2 of the two bogies. This floor is of a flat design without requiring complicated wheel cases or the like. As a result of the narrow wheel base the running wheels are almost totally enclosed by the vehicle body and hardly visible from the outside. Mounted on the floor 19 is the vehicle cabin 18 with an entrance door 44.

The running wheels 3 are tire wheels and run on a track 21 of a U-shaped cross section. The drive is by way of a hauling rope 20 taut within the track. The front bogie 1 in the direction of motion is equipped with a rope clamping device 24 which holds the hauling rope in a clamping manner. In the rear bogie 1' the hauling rope is simply guided, without being held in a clamping manner. However, the rear bogie features a supervision assembly 40 which triggers emergency braking in case of a slack rope.

Figure 4:
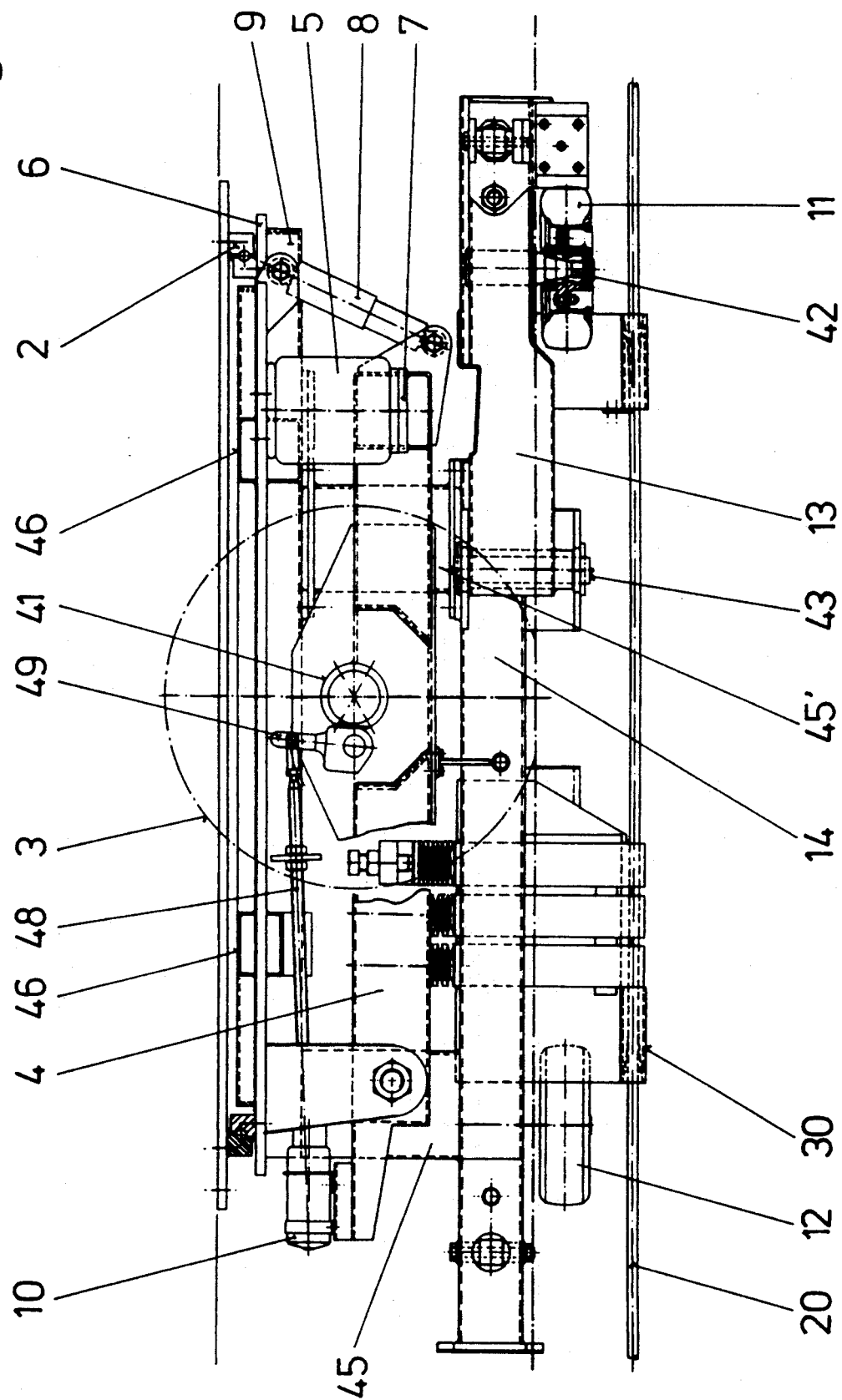
FIG. 4 is a side view of a rope-hauled bogie.

The overall arrangement of vehicle support and guidance is particularly apparent in FIG. 4. The guide wheels 11 and 12 press laterally against track 21 and in this way ensure straight guidance of the running wheels 3. Here the guide wheels are also designed as tire wheels. However, they could also be solid rubber wheels, coated metal wheels or similar. In certain cases it is of course thinkable that the guide wheels are eliminated because the running wheels are guided in a different way. The running wheels could be rail wheels, for example. In this case the bogie would be without guide body 14 altogether or it would have a guide body for the purpose of rope attachment only.

Figure 5:
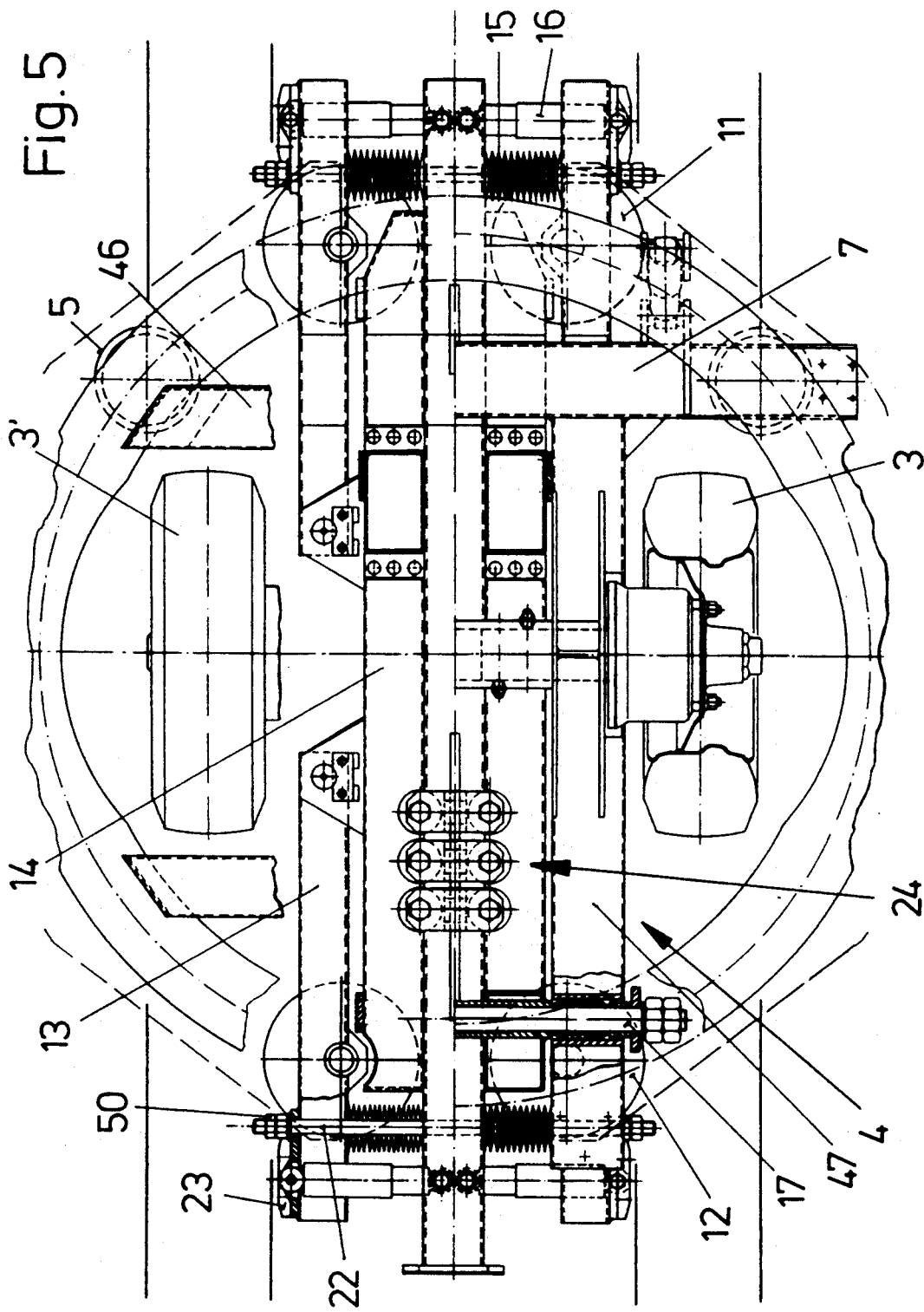
FIG. 5 is a top view of the bogie as per FIG. 4.
Figure 6:
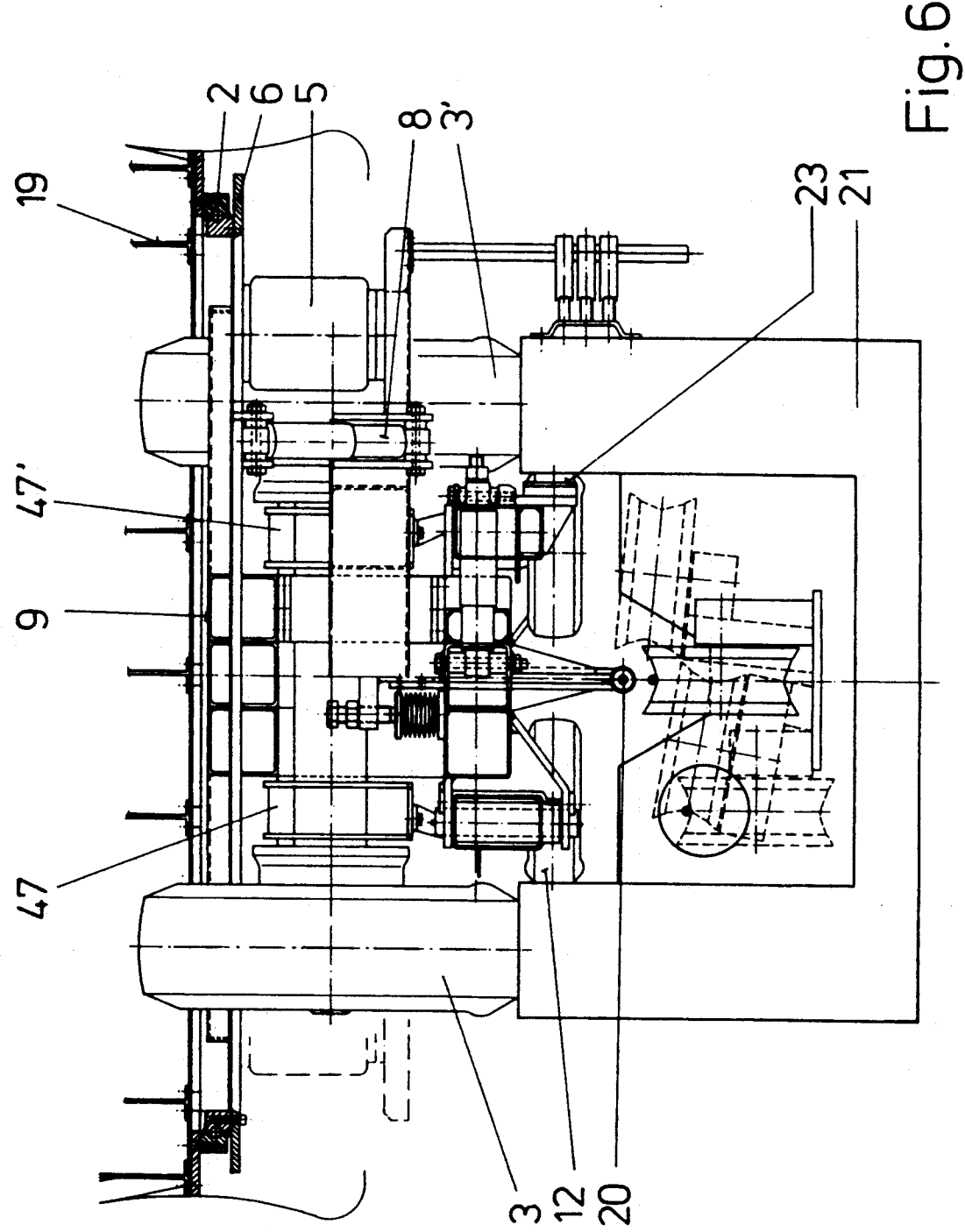
FIG. 6 is a view of the bogie in track direction from the direction of arrow A as per FIG. 5.

In FIGS. 4 to 6 bogie 1 of FIGS. 2 and 3 is presented in more detail. The slewing ring 2 of essentially known design rests on the circular ring-shaped platform 6. This platform, together with guide body 14, is part of a rigid frame. In its center, platform 6 is reinforced by a crosstie 9 consisting of hollow profiles welded together. Guide body 14 is also welded from hollow profiles, as can be seen in FIG. 6. Crosstie 9 and guide body 14 are of about the same width and are connected to each other at a distance by the two connecting pieces 45 and 45'. Finally, lateral struttings 46 are welded-in between platform 6 and crosstie 9.

The rocking frame 4 is hinged to the connecting piece 45 by joint 17. The rocking frame consists of two parallel longitudinal beams 47 and 47' and of the transverse bar 7. The two connecting pieces 45 and 45' are located between these two longitudinal beams.

A pneumatic spring 5 is mounted at each of the outer ends of the transverse bar 7. The springs support platform 6. As can be seen in FIG. 5, the resilience points are located relatively far from the centre of the bogie and still outside the running wheels 3 and 3', resulting in a particularly favourable spring effect.

Axle 41 of the running wheels 3 and 3' runs on bearings held by the two longitudinal beams 47 and 47' of rocking frame 4. Hereby the axle runs approximately through the centre of slewing ring 3. As is evident from FIGS. 4 and 6, the running wheels reach up slightly beyond the slewing ring into floor 19.

Slightly to the inside of the two pneumatic springs 5, between transverse bar 7 and platform 6, a pair of shock absorbers 8 is hinged to cushion knocks and bumps in the vertical direction. The rocking frame 4 serves particularly well to carry certain auxiliary devices. As can be seen from FIG. 4, a pneumatic braking device 10, for example, can be mounted on the rocking frame. This acts over a rod assembly 48 and a brake lever 49 directly onto axle 41 of the running wheels and serves to stop the vehicle in an emergency situation, e.g. in case of a wire breakage or failure of a running or guide wheel. However, it is readily conceivable also to mount a drive motor on rocking frame 41, e.g. an electric motor driving axle 41, as described hereafter.

On guide body 14, the transverse links 13 are hinged to joints 43 on both sides of axle 41 for the running wheels. The guide wheels 11, 11' and 12, 12' respectively are held by vertical axles 42. These axles 42 are located roughly in the radius range of slewing ring 2. Each 2 neighbouring transverse links 13 are penetrated by a tie rod 22. At this point the guide body 14 is of a slightly more narrow design and consists of only one single hollow profile. Disk springs are placed on the tie rod between guide body 14 and transverse links 13, pre-stressing the transverse links outwards against track 21. Nuts 50 are located at both ends of the tie rod, allowing adjustment of the prestress of the guide wheels. Shock adsorbers 16 are also hinged between the transverse links 13 and guide body 14, cushioning knocks and bumps in horizontal direction. Sliding blocks 23 are arranged on the outside of the transverse links in such a way that they could temporarily assure tracking stability in the place of a guide wheel. If, for example, a guide wheel bursts, the sliding block is pressed against the track by the spring force of the disk springs 15. Emergency braking by means of braking device 10 is initiated at the same time, triggered by a sensor. The sliding block 23 is capable of holding the bogie on track 21 until standstill. Similar sliding blocks can be mounted also under rocking frame 4 in order to prevent tilting of the vehicle in case of failure of a running wheel.

Figure 7:
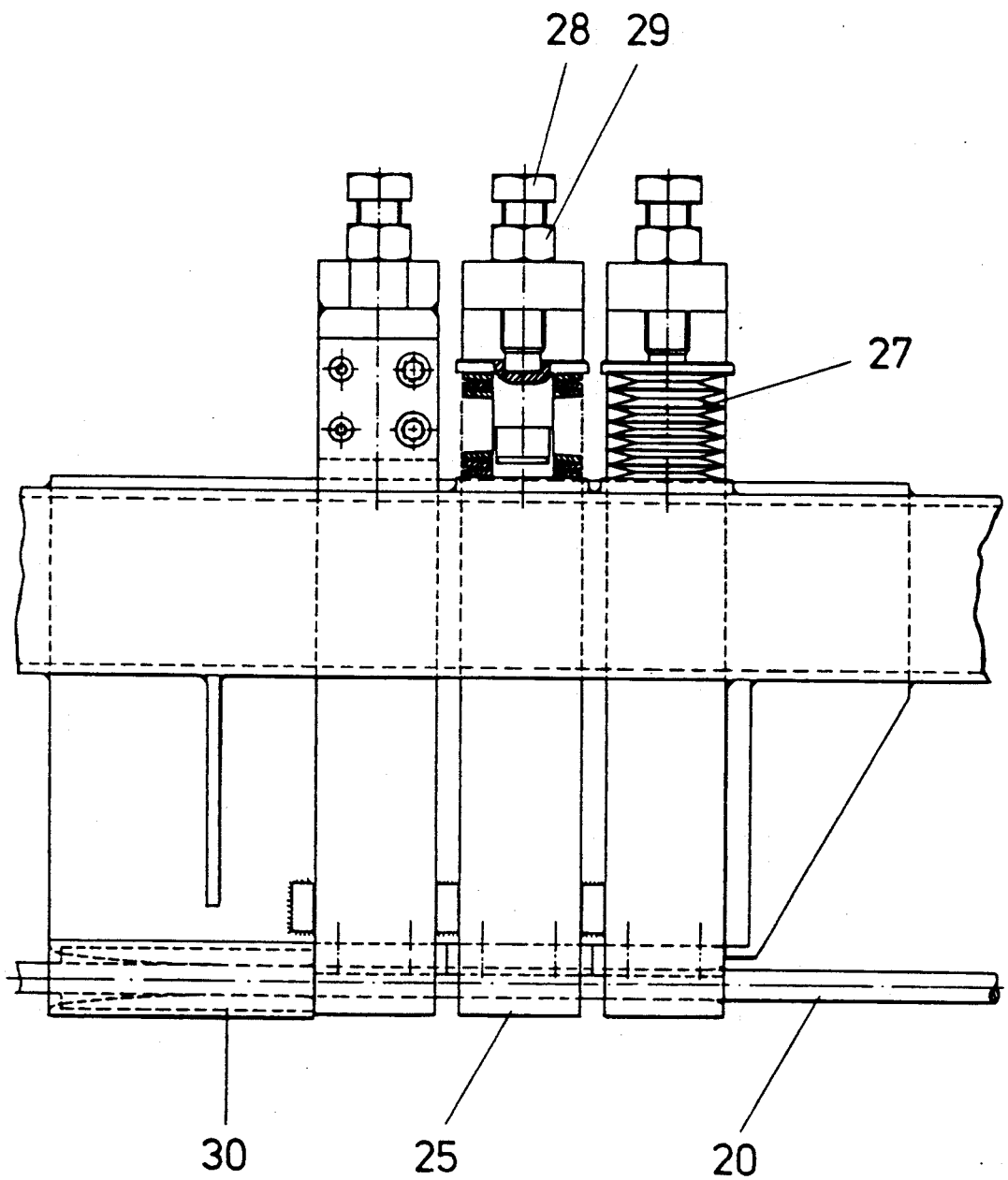
FIG. 7 is a side view of the rope clamping device in slightly enlarged presentation.
Figure 8:
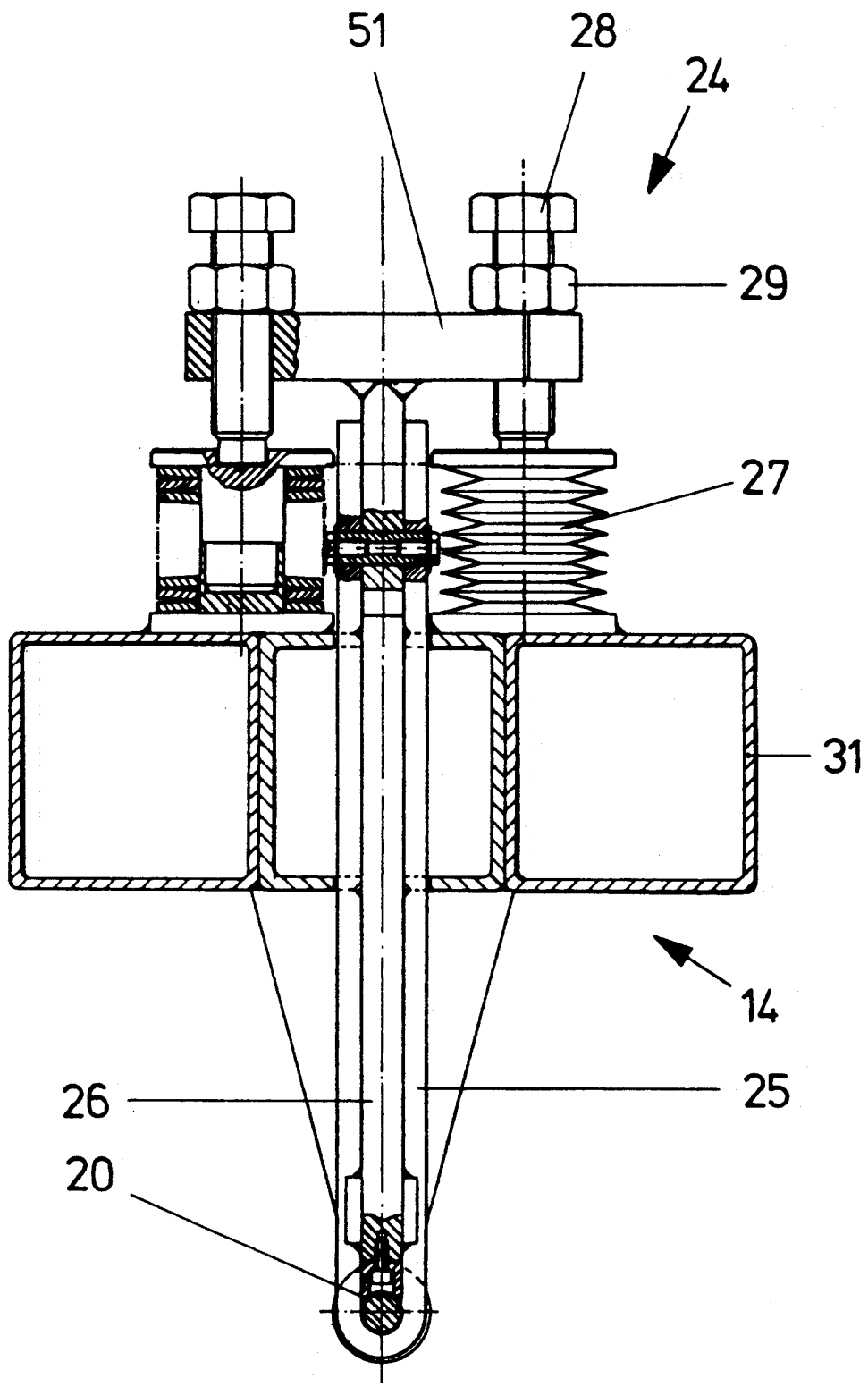
FIG. 8 is a cross section through the rope clamping device as per FIG. 7.

Hauling rope 20 is fastened to the bogie by means of a rope clamping device 24 illustrated in more detail in FIGS. 7 and 8. The individual hollow profiles 31 of guide body 14 are clearly visible in FIG. 8. The rope clamping device consists of individual U-shaped rope clamping bows 25 which penetrate the guide body. At their top end the rope clamping bows are linked by a T-piece 51 featuring adjusting screws 28 on both sides, to be locked with counternuts 29. Spring assemblies 27 are arranged on both sides of rope clamping bows 25, pre-stressing the bows upwards via the adjusting screws. The pre-stressing force can be adjusted by means of adjusting screws 28.

The rope clamping bows 25 are guided by a clamping device 26 which penetrates several rope clamping bows 25 like a sword and which is firmly attached to the underside of guide body 14. Hauling rope 20 is located at the lowest point of the rope clamping bows 25 and is pressed against clamping device 26 by the spring force.

This rope clamping device presents the advantage that the hauling rope in the form of an endless loop can be clamped tight at any position, ensuring that the rope is subjected to even stresses. Furthermore, the clamping force can be adjusted in such a way that the hauling rope is pulled through the rope clamping device if a certain hauling force is exceeded. This would diminish e.g. the effect of a collision of the vehicle with an obstruction on the track. The hauling rope is guided into the rope clamping device through a guide trumpet 30. This prevents harmful kinking or friction in case of slight bending of the rope. Fastening of the hauling rope is preferably done between the axles of the front guide wheels 12 and 12'. In this way the rope is always held in the centre of the bogie; even if the bogie turns in the slewing ring on travelling through a curve.

Figure 10:
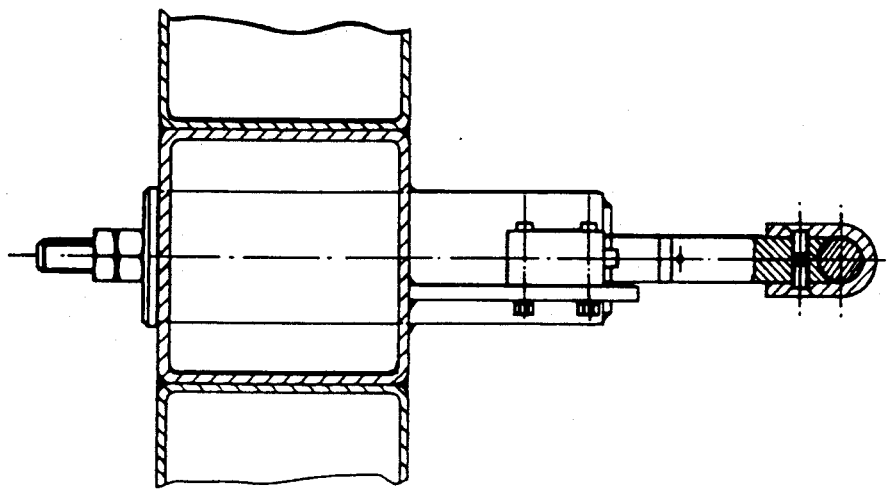
FIG. 10 is a cross section through the supervision assembly as per FIG. 9.
Figure 9:
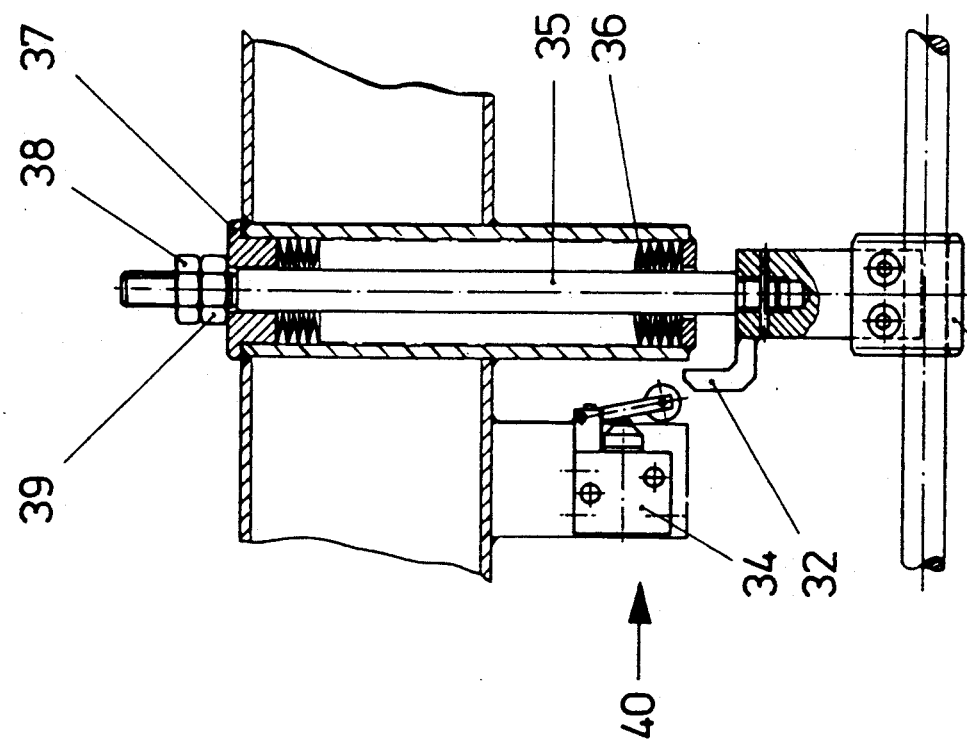
FIG. 9 is a partly cut side view of the supervision assembly.

FIGS. 9 and 10 illustrate the supervision assembly 40 intended for the rear bogie 1'. The assembly consists of a feeler 32 fastened to hauling rope 20 by means of a rope clamp 33. The feeler is guided by guide rod 35 in vertical direction and is pre-stressed upwards by a spring assembly 36. The top end of guide rod 35 protrudes through spigot-shaft 37 and features a nut 39 which serves to adjust the pre-stressing force. This nut is secured with counternut 38. In normal operation feeler 32 is pulled downwards by the tension force of the hauling rope and held in a neutral operation position. As soon as the rope tension is reduced due to e.g. a rope breakage, the feeler is pulled upwards by the spring force of spring assembly 36 and actuates a switching assembly 34. In the execution example the switching assembly is a multi-way valve which releases the pressure to act on the pneumatic braking device 10.

Figure 11:
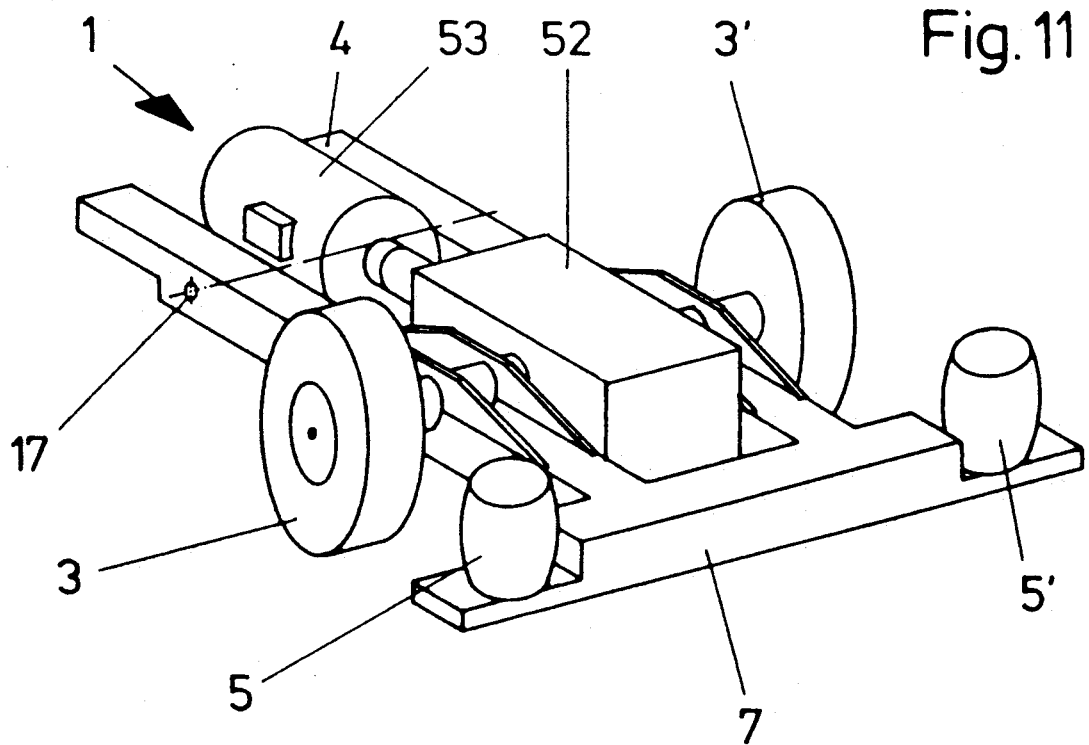
FIG. 11 is a rocking frame for a bogie with motor drive.
Figure 12:
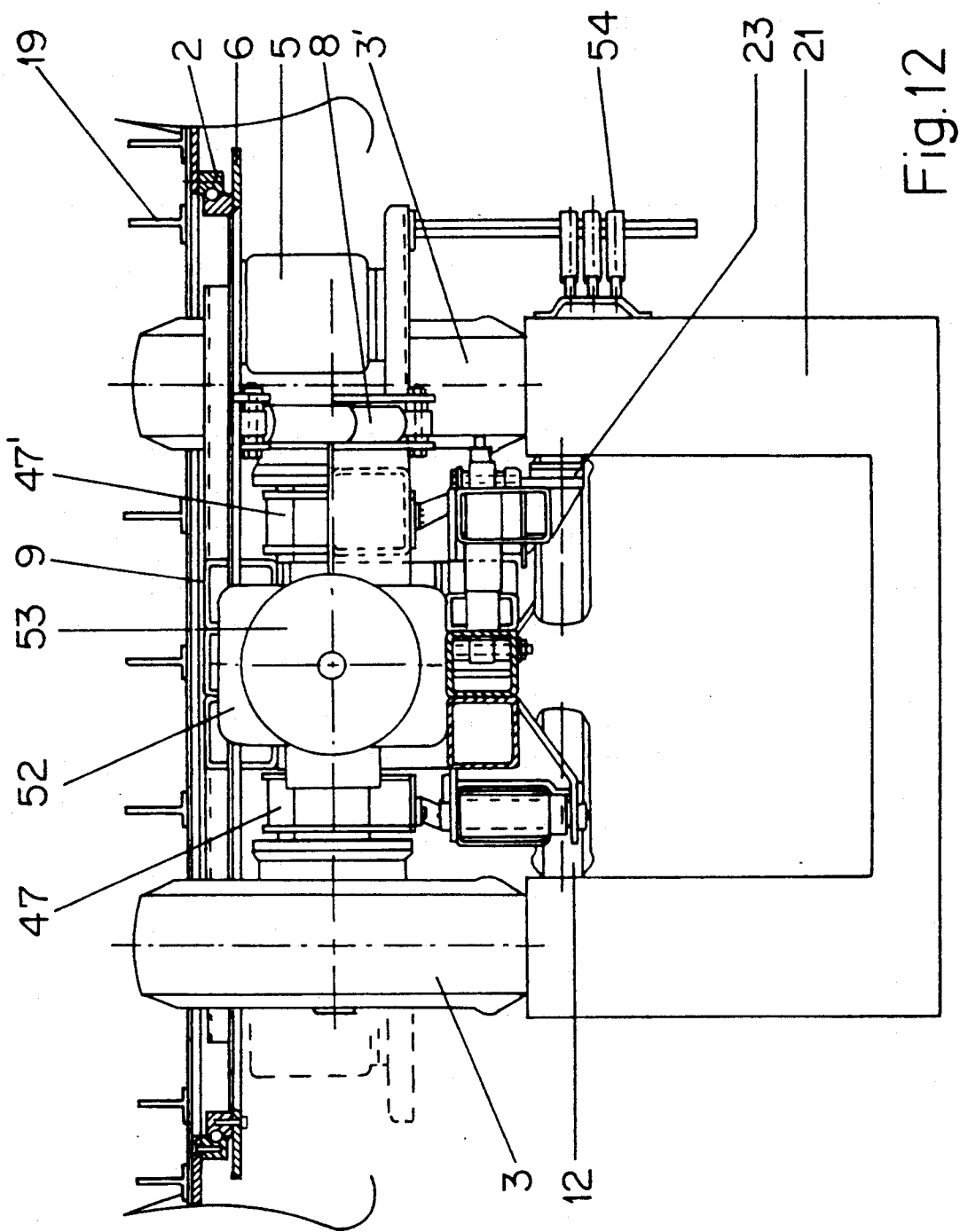
FIG. 12 is a view analogous to FIG. 6, but of a motor-driven bogie.

FIGS. 11 and 12 illustrate an execution example of a bogie with a motor drive. FIG. 11 shows only the rocking frame in perspective presentation, with a motor 53, e.g. an electric motor, mounted on it. The pair of running wheels 3, 3' is driven over a differential gear 52 located between the running wheels. A smaller motor with its own gearing could also be allocated to each running wheel for space or weight reasons. As can be seen, the axle of the running wheels does not pass right through in the case of the motor drive, i.e. each running wheel has its own axle stub.

Figure 13:
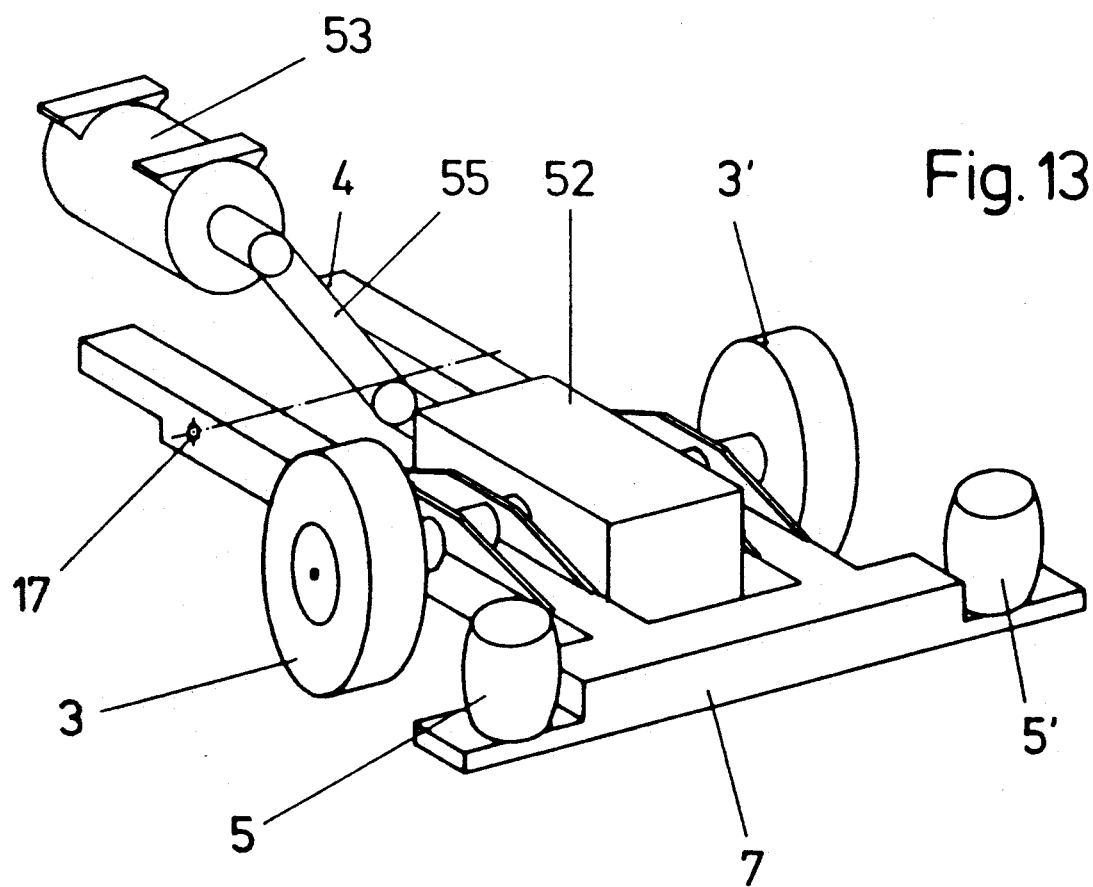
FIG. 13 is an example of an execution alternative of a rocking frame with motor drive.

As is visible particularly from FIG. 12, motor and gearing can be arranged very advantageously beneath the vehicle cabin in this manner. As FIG. 13 indicates, the motor 53 does not necessarily have to be allocated to the bogie. It could also be suspended from the cabin floor, firmly positioned in relation to the bogie. In this case the differential gear 52 is driven by a cardan shaft 55. The power supply to the motor 53 is over a contact rail 54, whereby this rail is also required for the rope-hauled version, namely for the power supply for illumination, control devices, etc.

The track 21 does of course not have to be of the configuration as illustrated in the drawings, and it does not necessarily have to be made of concrete. Thinkable and in practice already applied are also tracks of steel, e.g. in the form of H-girders arranged in parallel. In such a case the guide wheels 11 and 12 would simply feature a slightly different swivelling range because the cross section of the steel girders has a different shape than the one of the concrete rail.

Figure 14:
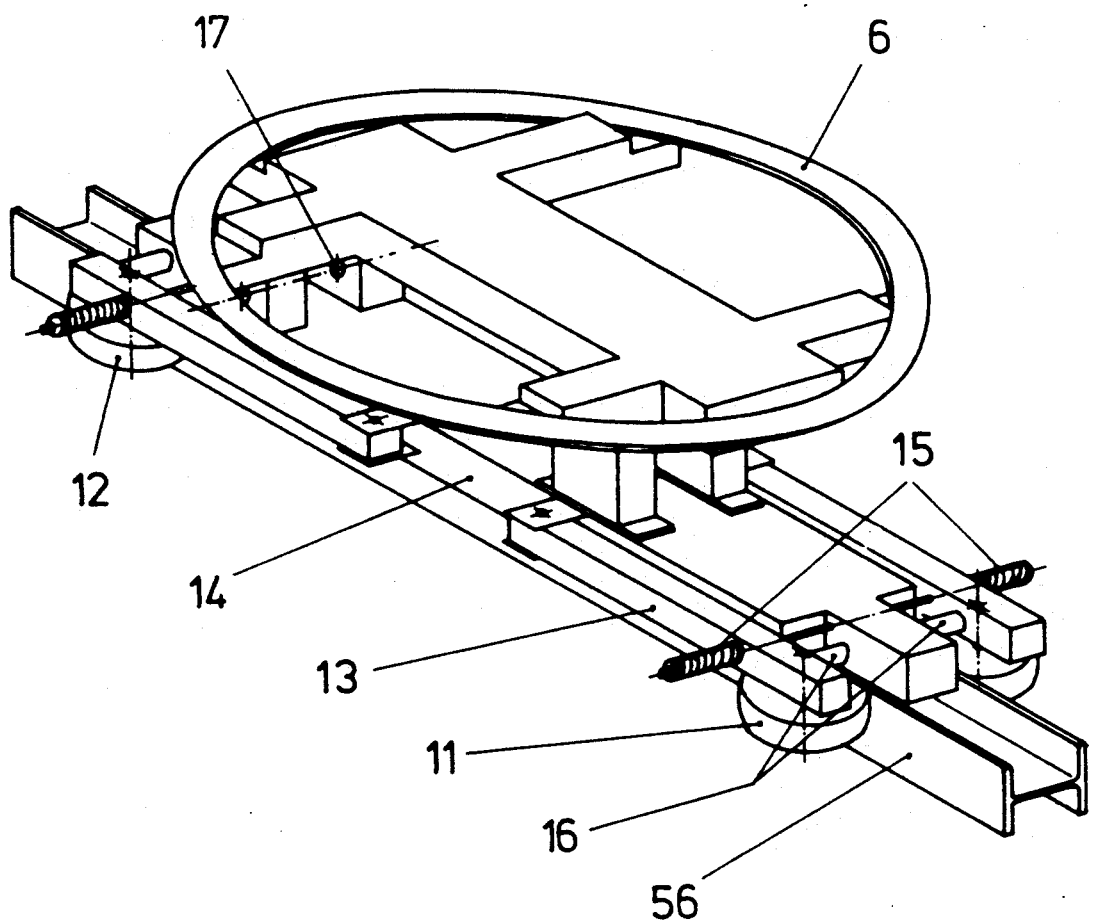
FIG. 14 is an example of an execution alternative of a guide body for central guidance.

FIG. 14 shows the variant of a guide body 14 where the transverse links 13 are not pressed outwards, but inwards against a guide rail 56 located between the guide wheels 11 and 11'. This guide rail can be a steel profile or a strip of concrete. The solution is especially suitable for motor-driven bogies where there is no need to guide a rope along the track. The spring assemblies 15 act on the outside of the transverse links 13. Otherwise, however, the construction of the bogie is the same as the one of the execution example described beforehand.

FIG. 15 shows the alternative of a guide body 14 with which the hauling rope 20 is deflectable in four directions so that curves towards all sides can be followed. For this purpose it is possible to arrange the hauling rope rollers 57 in horizontal, vertical or slanted position right around the hauling rope. An asymmetrical rope fixation device 58 is required for this purpose.

Contrary to FIG. 6, the transverse links 13 with the guide rollers 11 can be pressed against the track 21 from the outside, as already illustrated by FIG. 14 with guide rail 56.

What is claimed is:

1. Bogie (1) for a track-guided vehicle, having a body frame with a slewing ring (2) affixed thereto, said bogie comprising
   a bogie frame rotatably connected to said slewing ring, a rocking frame (4) connected to said bogie frame by a hinge connection (17) at one end of the rocking frame permitting said rocking frame to swivel vertically with respect to said bogie frame, at least one spring device (5,5') extending between said bogie frame and a second end of said rocking frame for resiliently supporting the vehicle, and a pair of running wheels (3) connected to the rocking frame in such a manner as to be located within the slewing ring (2).

2. Bogie according to claim 1, wherein the bogie frame comprises a platform (6) for bearing against the slewing ring (2), and said rocking frame (4) has at said second end, a transverse bar (7) having two outer ends, each end extending beneath and supporting a respective one of said spring devices (5,5') on which the platform is supported.

3. Bogie according to claim 2, further comprising at least one shock absorber (8) extending between the frame and platform (6) respectively, and the rocking frame (4).

4. Bogie according to claim 2, wherein the spring devices (5, 5') are pneumatic springs.

5. Bogie according to claim 2, wherein the platform (6) comprises an annular member, and a crosstie (9) affixed along a diameter of the annular member, thereby defining segment-shaped spaces on either side of the crosstie, and wherein the running wheels are situated each in a respective one of said spaces.

6. Bogie according to claim 1, further comprising a braking device (10) for braking the running wheels (3, 3'), arranged on the rocking frame (4).

7. Bogie according to claim 1, further comprising a guide body mounted on the bogie frame under the slewing ring and at least one pair of guide wheels (11, 11') fastened to the guide body for lateral tracking stability, each guide wheel (11, 11') of the pair of guide wheels being mounted on a transverse link (13) which swivels horizontally and is flexibly hinged to the guide body (14).

8. Bogie according to claim 7, further comprising a shock absorber (16) extending between each of the transverse links (13) and the guide body (14).

9. Bogie according to claim 7, wherein two pairs of guide wheels (11, 11', 12, 12') are arranged at the guide body (14) and the axles (42) of the guide wheels are arranged approximately in the radius range of the slewing ring.

10. Bogie according to claim 7, wherein the two transverse links of a pair of guide wheels are penetrated by one joint tie rod (22) limiting the swivelling motion, and in that a disk spring assembly held by the tie rod is arranged between each of the transverse links and the guide body.

11. Bogie according to claim 7, further comprising a sliding block (23) arranged at the end of each transverse link in such a way that, in case of a loss contact of the guide wheel, the block temporarily assures tracking stability.

12. Bogie according to claim 7, wherein in that the rocking frame (4) is arranged between the guide body (14) and the slewing ring.

13. Bogie according to claim 7, further comprising a rope clamping device (24), for fastening of a hauling rope (20), affixed to the guide body (14).

14. Bogie according to claim 13, wherein the rope clamping device features several U-shaped rope clamping bows (25) arranged one behind the other, these bows penetrating the guide body (14), whereby a clamping device (26) is arranged in each rope clamping bow and whereby the clamping force between rope clamping bow and clamping device can be adjusted by means of a clamping assembly located on the guide body.

15. Bogie according to claim 13, wherein the rope is guided into the rope clamping device (24) through a guide trumpet (30) attached to guide body (14).

16. Bogie according to claim 13, further comprising a supervision assembly (40) for the supervision of the rope tension is attached to guide body (14).

17. Bogie according to claim 16, wherein the supervision device is equipped with a feeler (32) which can be fixed to the hauling rope (20) and which is under spring-prestress, whereby the feeler can be fixed in a neutral position under the influence of the rope tension so that a switching device (34) is actuated in case of a decrease of the rope tension.

18. Bogie according to claim 1, further comprising at least one drive motor (53) connected to the running wheels (3, 3') is located on the rocking frame (4).

19. Bogie according to claim 1, further comprising at least one drive motor (53) attached to the vehicle body, firmly mounted in relation to the bogie, and connected to the running wheels (3, 3') by a cardan shaft (55).

20. Bogie according to claim 7, wherein a pair of guide wheels for support against a guide rail (56) running between them are pre-stressed in the direction towards each other.

* * * * *